June 23, 1942.    R. C. SPRINGSTON    2,287,456
SEALING MEANS
Filed March 28, 1940
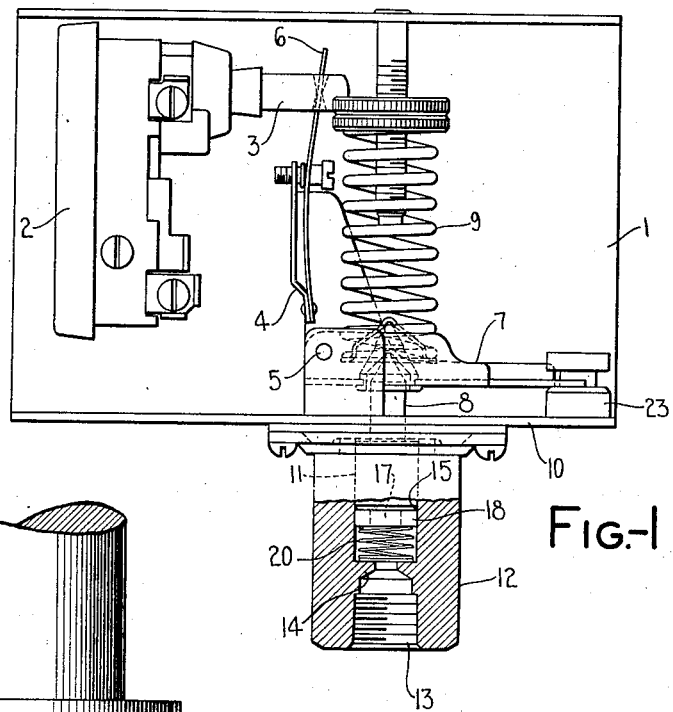
FIG.-1
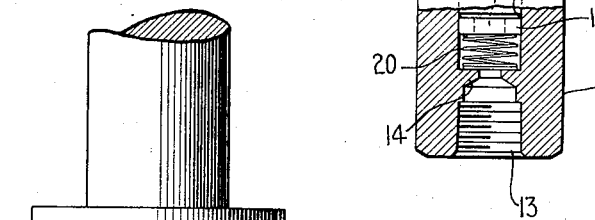
FIG.-2
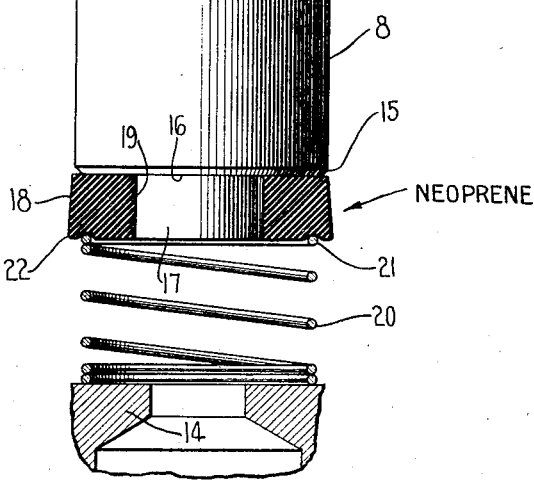
INVENTOR
Roscoe C. Springston
BY
Andrew K. Foulds
his Attorney Patented June 23, 1942

2,287,456

UNITED STATES PATENT OFFICE 2,287,456

SEALING MEANS

Roscoe C. Springston, Detroit, Mich., assignor to Detroit Lubricator Company, Detroit, Mich., a corporation of Michigan Application March 28, 1940, Serial No. 326,523

4 Claims. (Cl. 309—23)

This invention relates to new and useful improvements in sealing means and more particularly to means for providing a fluid-tight seal for the clearance between a plunger and its cylinder. In pressure operated control devices wherein a sealing means must be provided for a pressure actuated piston of small diameter it is impracticable where extremely high pressures are encountered to utilize metallic diaphragm or bellow seals. Other common forms of piston packing have also failed to provide an efficient and effective seal.

It is therefore one object of this invention to provide a sealing means for fluid pressure which will tightly close the joint or clearance between a piston and its cylinder walls without causing a drag on the moving part or permitting leakage such as would upset the calibration and accurate response of pressure operated control mechanism to change of fluid pressure.

The invention consists in the improved construction and combination of parts to be more fully described hereinafter and the novelty of which will be particularly pointed out and distinctly claimed.

In the accompanying drawing to be taken as a part of this specification there is fully and clearly shown a preferred embodiment of the invention, in which drawing:

Figure 1 is a view in elevation of a control device having a portion thereof broken away to show the invention, and Fig. 2 is an enlarged detail view of the invention having a cylinder portion removed to show the unconfined action effected by certain of the parts.

Referring to the drawing by characters of reference, the numeral 1 designates generally a support which carries a switch housing 2 from which a reciprocal switch operating plunger 3 extends. A bell crank lever 4 is pivoted on a shaft 5, carried by the support 1 and has one of its arms 6 operatively connected to the plunger 3. The other arm 7 of lever 4 is movable by a fluid pressure operated piston or thrust member 8 in opposition to the force of an adjustable controlling spring 9. The piston 8 extends downward through an aperture in the bottom wall 10 of the support 1 and into the cylinder or bore 11 of a housing 12. The piston 8 reciprocally fits and is guided for longitudinal movement in the bore 11. The other end of the open ended bore 11 is internally screw-threaded, as at 13, for connection to a fluid pressure conduit leading from a source of controlling pressure. Within the bore 11 there is an internal annular shoulder 14 providing a fluid admission port to the piston chamber of bore 11 and also serving as an abutment. The marginal edge of the piston 8 which faces the shoulder 14 is chamfered, as at 15, for a purpose to be described. Extending concentrically from the end face 16 of piston 8 and toward the shoulder 14 there is a cylindrical post 17 which receives a sealing member 18. This sealing member is of a pliable, flexible material which is resilient and impervious such as, for example, neoprene. The member 18 when inert and removed from the apparatus is a cylindrical disk having an external diameter slightly larger than the diameter of bore 11 so that when the member 18 is in place, it tightly fits the bore. The post 17 is of about one half the diameter of the piston 8 and fits tightly within a central aperture 17 through the sealing member 18 so that the post 17 provides a backing for radial compression of the sealing member and reduces the extent of its radial compression. The tight fit of member 18 on post 17 prevents leakage around the post. Positioned between the abutment 14 and the sealing member 18 there is a helical coil compression spring 20 of light weight or small force which has an end coil or turn 21 directly engaging the surface of the peripheral or external boundary and the marginal or border portion of the sealing member 18. This end turn 21 serves under the force of the spring which is insufficient to upset the operation of switch 2 by the spring 9, to indent the face of the member 18 thereby tending to displace the marginal portion of the member 18 laterally and compressing this marginal portion radially against the wall of bore 11. The chamfer 15 relieves the marginal edge of the member 18 from backing by the piston and therefore permits the spring 20 to displace the marginal edge portion of member 18 into a more tight engagement with the wall of bore 11. This displacement is a flaring of the side wall of member 18 as shown in Fig. 2, such that there is a taper toward the piston with the result that the sealing member edge portion 22 has the greatest compressive force against the chamber wall.

These parts have functioned satisfactorily in operation when, solely for example, certain of the cooperating parts have been proportioned or dimensioned as follows: The bore 11 has a diameter of 0.4985 inch to 0.4990 inch. The sealing member 18 is one eighth inch thick and has a one half inch diameter when not under stress. The spring 20 is made of 0.020 inch diameter music wire with three active turns or coils and having a seven pound scale per inch. The spring exerts say between 12 and 20 ounces resistance when compressed to a length of one-quarter inch which is the maximum compressed working length.

The operation of the control device with the novel sealing means is as follows: Upon high pressure being applied to the bore end 13, the pressure fluid which tends to compress the sealing member 18 acts with the spring 20 to tightly seal the joint between the piston 8 and the wall of bore 11. The exertion of the maximum force against wall of bore 11 by spring 20 at edge 22 caused the fluid pressure to tend to hold the sealing member in tighter engagement with the chamber wall. When the fluid pressure acting on piston 8 exceeds the opposing force of spring 9 then the lever 4 will be rotated from its supporting abutment 23 and in a direction so that arm 6 moves switch operating plunger 3 toward the left, facing Fig. 1. Upon a decrease of pressure such that spring 9 can move the plunger 8 downward, the sealing member 18 will be maintained in sealing position by spring 20 and the lever arm 6 will move the switch operated plunger 3 toward the right and to the position shown. It should be noted, that the force of spring 20 relative to the force of spring 9 should be kept at a minimum to avoid change in the operating characteristics of the control device.

What I claim and desire to secure by Letters Patent of the United States is:

1. In a pressure operated device, a tubular housing having an open-ended bore for connection at one end to a source of high pressure, a piston reciprocally fitting in said bore and projecting from the other end thereof, a flexible, pliable sealing member seated against said piston within said bore, said sealing member having a diameter greater than the diameter of said bore such that said sealing member is radially under compression, and a helical coil compression spring holding said sealing member against said piston, said spring having an end coil directly engaging and indenting the peripherally marginal portion of said sealing member, the indentation of said sealing member by said spring acting to compress further the peripherally marginal edge portion of the spring engaged face of said sealing member laterally into tight engagement with said bore.

2. In a pressure operated device, a tubular housing having an open-ended bore for connection at one end to a source of high pressure, a piston reciprocally fitting in said bore and projecting from the other end thereof, a post projecting concentrically from said piston toward said shoulder, a flexible, pliable sealing member seated against said piston within said bore, said sealing member having a central aperture tightly receiving said post thereby to rigidly back the radial compression of said sealing member, said sealing member having a diameter greater than the diameter of said bore such that said sealing member is radially under compression, and a helical coil compression spring holding said sealing member against said piston, said spring having an end coil directly engaging and indenting the peripherally marginal portion of said sealing member, the indentation of said sealing member by said spring acting to compress further the peripherally marginal edge portion of the spring engaged face of said sealing member laterally into tight engagement with said bore.

3. In a pressure operated device, a housing having a bore for connection at one end to a source of high pressure, a piston reciprocally fitting in said bore, a flexible, pliable sealing member seated against said piston within said bore, said sealing member having a diameter greater than the diameter of said bore such that said sealing member is radially under compression, resilient force exerting means holding said sealing member against said piston, said force means having a portion thereof in direct contact with said sealing member, the entire force exerted by said force means against said sealing member being transmitted through said direct contact portion and in a direction solely parallel to the path of movement of said piston and acting to compress at least a peripherally marginal continuous edge portion of said sealing member, the compression of said sealing member by said force means acting to laterally displace a peripherally marginal continuous portion of said sealing member so that the peripherally marginal portion is laterally flexed into tight engagement with said bore.

4. In a pressure operated device, a housing having a bore for connection at one end to a source of high pressure, a piston reciprocally fitting in said bore, said piston having a pressure-receiving end surface portion lying in a plane substantially normal to the path of movement of said piston, a flexible, pliable sealing member seating against said end surface portion, a resilient force exerting means having a portion in direct contact with and bearing at least adjacent the peripherally marginal edge of said sealing member so that said sealing member has a free peripherally marginal edge portion, said resilient means acting to compress said sealing member longitudinally into contact with said end surface portion, the entire force exerted by said force means against said sealing member being transmitted through said direct contact portion and in a direction solely parallel to the path of movement of said piston, said sealing member having substantially parallel end walls so that it is of substantially uniform thickness and having sufficient radial dimension inward of said free peripherally marginal edge portion that the longitudinal compression of said sealing member by said force means will displace the peripherally marginal edge portion of said sealing member in a laterally outward direction to laterally displace a peripherally marginal continuous portion of said sealing member into tight engagement with said bore.

ROSCOE C. SPRINGSTON.